April 3, 1945.                J. S. MARTIN                2,372,967
                              CARGO TIE-DOWN
                            Filed May 3, 1943
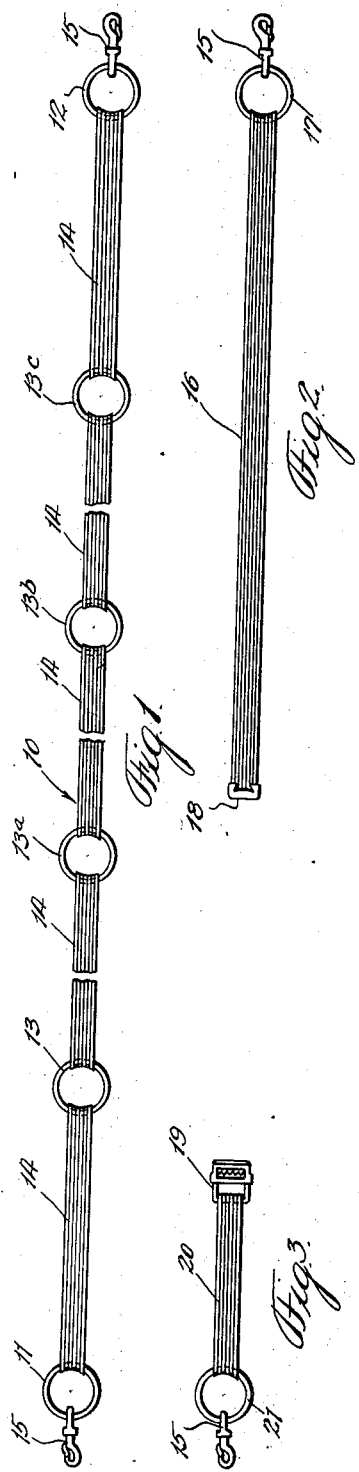
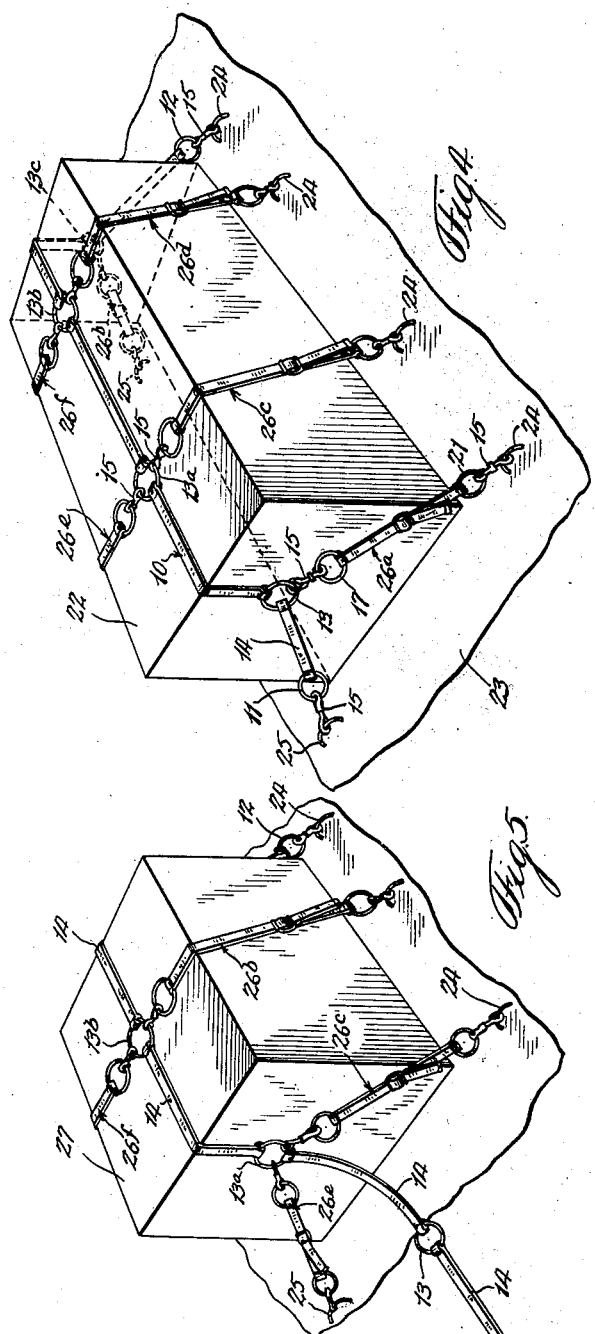
Inventor:
Joseph S. Martin
By Thiess, Olson & Mecklenburger
Attys.

Patented Apr. 3, 1945

2,372,967

UNITED STATES PATENT OFFICE 2,372,967

CARGO TIE-DOWN

Joseph S. Martin, San Carlos, Calif., assignor to United Air Lines, Inc., a corporation of Delaware Application May 3, 1943, Serial No. 485,520

4 Claims. (Cl. 248—361)

This invention relates to cargo tie-downs, more particularly to a cargo tie-down set for detachably securing a cargo unit or package between spaced apart rows of floor rings in a cargo aircraft, and the invention has for an object the provision of improved, readily securable and readily releasable tie-downs of this character.

In cargo-carrying aircraft it is essential that the cargo units or packages, which may vary widely in size and shape, be so secured as to prevent shifting during flight of the aircraft. At the same time, in order to take full advantage of the transportation speed made possible by cargo aircraft, it is imperative that the loading and unloading times be shortened to as great an extent as possible. It has heretofore been proposed in various types of transport vehicles to provide spaced apart floor rings or anchoring devices to which the ends of ropes, chains or the like, encircling the cargo, may be tied or secured in order to prevent shifting of the cargo. In such prior arrangements, however, difficulties have been encountered in properly securing the cargo without complicating tying or fastening operations to such an extent as to prolong unduly the loading and unloading.

It is accordingly a further object of this invention to provide a cargo tie-down particularly suitable for cargo aircraft, wherein knotting, twisting or similar fastening expedients are avoided and by virtue of which cargo units of various sizes and shapes may be secured against shifting movement, and which may be quickly applied and released.

For a more complete understanding of the invention, reference should now be had to the drawing in which:

Fig. 1 illustrates a master ring strap forming a part of an improved cargo tie-down set embodying the present invention;

Figs. 2 and 3 respectively illustrate a cinch strap and an anchor strap which cooperate to form adjustable auxiliary straps of a cargo tie-down set embodying this invention;

Fig. 4 is a perspective view of a cargo unit or package secured to the floor of a cargo aircraft or similar transport vehicle by a tie-down set comprising the straps illustrated in Figs. 1 to 3, inclusive; and Fig. 5 is a view similar to Fig. 4 illustrating another application of the cargo tie-down set to a different cargo unit.

Referring now to the drawing, the invention is shown as applied to a cargo tie-down set comprising a master ring strap 10 which is made up of a pair of terminal rings 11 and 12, a plurality of intermediate rings 13, 13a, 13b, and 13c, and a plurality of flexible strap portions 14 which are looped around the adjacent rings so as to interconnect the same and form the desired ring strap. As shown, each of the terminal rings 11 and 12 is provided with a fastener 15, which may be of any suitable type well known in the art, adapted to be snapped over and to be readily released from a ring, hook or other anchoring device.

The cinch strap shown in Fig. 2 comprises a strap portion 16 having a ring 17 at one end thereof, the ring 17 being provided with one of the fasteners 15, and the opposite end of the strap portion 16 being provided, if desired, with a tip 18 to facilitate threading through a suitable buckle, such for example as the buckle 19 shown as comprising part of the anchor strap illustrated in Fig. 3. In addition to the buckle 19, which may be of any desired type to permit ready adjustment and tight clamping of a strap threaded therethrough, the anchor strap shown in Fig. 3 comprises a strap portion 20 having a ring 21 on the opposite end thereof, which ring 21 is provided with one of the detachable fasteners 15.

It will be understood that the cargo tie-down set includes, in addition to the master ring strap shown in Fig. 1, a plurality of adjustable auxiliary straps each of which consists of the cinch and anchor straps shown in Figs. 2 and 3, and Fig. 4 illustrates the application of the cargo tie-down set to a suitable cargo unit or package 22, which is disposed on the floor 23 of a cargo aircraft or other vehicle and located intermediate spaced rows 24 and 25 of suitable floor rings or anchoring devices which are permanently secured to the floor. Although only two of the floor rings in the row 25 are shown, it will be understood that the rows are identical and consist of the same number of similarly spaced anchoring devices.

Although the cargo unit 22 is shown in Fig. 4 as comprising a single packing case or box, it will of course be understood that it may comprise a plurality of individual cases or boxes stacked so as to provide a cargo unit of substantially the size and shape shown. The master ring strap 10 extends along the top of the cargo unit with the rings 13a and 13b overlying the top, the strap being of sufficient length so that the intermediate rings 13 and 13c depend from the ends of the cargo unit. As shown in Fig. 4, the fastening means 15 on the terminal rings 11 and 12 are respectively secured to the left-hand one of the floor hooks in the row 25 and the right-hand one of the floor hooks in the row 24, as viewed in Fig. 4, i. e. the floor rings or hooks which are disposed adjacent diagonally opposite corners of the cargo unit.

In order to tighten the master ring strap across the top of the cargo unit longitudinally thereof, and to likewise tighten and secure it across the ends of the cargo unit in angular relation, two of the above-described adjustable auxiliary straps are provided, as indicated by the reference numerals 26a and 26b respectively. The auxiliary adjustable strap 26a is disposed with the fastener 15 on the ring 17 detachably engaging the intermediate ring 13, and with the fastener 15 on the ring 21 detachably engaging the left-hand one of the floor rings in the row 24. Similarly, the auxiliary adjustable strap 26b connects the intermediate ring 13c with the right-hand one of the rings in the row 25, and it will be apparent that when the straps 26a and 26b are tightened by drawing the free end of the cinch strap 16 through the buckle 19 of the anchor strap, the master ring strap will be tightened longitudinally of the cargo unit along the top thereof and angularly across the ends thereof.

In order further to secure the master ring strap and to prevent transverse shifting of the cargo unit 22, additional auxiliary straps 26c, 26d, 26e, and 26f are arranged, as shown in Fig. 4, with one end of each of the straps 26c and 26e connected to the intermediate ring 13a and with the opposite ends of these straps connected to suitable floor rings in the rows 24 and 25, respectively, only a part of the strap 26e being shown. Similarly, the straps 26d and 26f are connected to the intermediate ring 13b and are connected at their opposite ends to floor rings in the rows 24 and 25. Thus the auxiliary straps 26c to 26f, inclusive, may be tightened down across the longitudinal edges of the cargo unit so as to restrain the cargo unit securely against transverse shifting.

It will be apparent that the application of the cargo tie-down set to the cargo unit requires only the snapping of the various straps together at the desired points, and the tightening of the auxiliary straps by means of the buckles 19, the rings and the snap fasteners 15 providing a secure and yet readily releasable connection, and that thus the cargo unit may be secured or released without expenditure of any substantial amount of time.

In the usual case a plurality of master straps comprising varying numbers of intermediate rings, and consequently being of varying lengths, will be provided so as to take care of cargo units of different shapes and sizes. Under emergency conditions, however, if the proper length of master ring strap is not available, cargo units of smaller size may be secured in the manner indicated in Fig. 5. In this arrangement, the intermediate ring 13a depends over one end of the cargo unit 27, and the adjustable straps 26c and 26e serve to tighten the master ring strap angularly over the end, the arrangement of the master ring strap and the adjustable strap 26b being the same at the other end of the cargo unit as is described above in connection with Fig. 4. As shown, the intermediate ring 13 and the terminal ring 11 do not form an operative part of the tie-down in this arrangement, but are merely allowed to lie free adjacent the end of the cargo unit, and the adjustable strap 26a of Fig. 4 is omitted entirely.

Attachment rings or other anchoring devices may, of course, be mounted on the side walls or ceilings of the cargo space as well as on the floor, and the present invention is equally adapted for use in conjunction with attachment means or anchoring devices so located. Accordingly, the terms "top," "upper edges," "depending" and similar expressions as used herein for convenience in defining the interrelation of the parts should be understood as being applied in a purely relative sense on the basis of considering that surface of the cargo unit which is adjacent the supporting surface, as the bottom thereof.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A cargo tie-down set comprising a master ring strap consisting of terminal rings connected by alternate strap portions and intermediate rings, and a plurality of auxiliary strap means each of which includes a cinch strap, an anchor strap and buckle means adjustably connecting said cinch and anchor straps, said cinch and anchor straps having end rings on the opposite ends thereof, and fastening means for detachably fastening said auxiliary strap means to said intermediate rings and to fixed supports and for detachably fastening said master strap to other fixed supports.

2. A cargo tie-down set comprising a master ring strap consisting of terminal rings connected by alternate interconnected strap portions and intermediate rings, fastening means for detachably fastening the terminal rings of said master strap to suitable supports, and a plurality of auxiliary strap means for connecting said terminal and intermediate rings to other suitable supports, each auxiliary strap means comprising a cinch strap, an anchor strap and an adjustable buckle interconnecting one end of each of said cinch and anchor straps, the opposite end of each cinch and anchor strap having an end ring thereon, and detachable fastening means for each end ring.

3. A cargo tie-down set for detachably securing a cargo unit disposed between spaced apart rows of anchoring devices, comprising a master strap having terminal rings connected by alternate strap portions and intermediate rings, means for detachably fastening said terminal rings to certain of said anchoring devices adjacent two corners of said cargo unit at opposite ends thereof with said master strap extending longitudinally over the top and angularly across portions of the ends of said cargo unit, said master strap being of a length such that when thus extended the first intermediate ring adjacent each terminal ring depends over the respective end of said cargo unit, two adjustable auxiliary strap means extending across the respective ends of said cargo unit in transverse angular relation to the adjacent end portions of said master strap and each having a ring at each end thereof, and detachable fastening means for fastening one end ring of each auxiliary strap means to the adjacent one of said depending intermediate rings and for fastening the opposite end ring of each auxiliary strap means to one of said anchoring devices adjacent the respective end corner of said cargo unit on the opposite side of the latter from the anchoring device to which the terminal ring is fastened at that end, whereby tightening adjustment of said auxiliary strap means is effective to tighten said master strap means angularly across the ends and longitudinally over the top of said cargo unit.

4. A cargo tie-down set for detachably securing a cargo unit disposed between spaced apart rows of anchoring devices, comprising a master strap having terminal rings connected by alternate strap portions and intermediate rings, means for detachably fastening said terminal rings to certain of said anchoring devices adjacent two diagonally opposite corners of said cargo unit with said master strap extending longitudinally over the top and angularly across portions of the ends of said cargo unit, said master strap being of a length such that when thus extended the first intermediate ring adjacent each terminal ring depends over the respective end of said cargo unit, two adjustable auxiliary strap means extending across the respective ends of said cargo unit in transverse angular relation to the adjacent end portions of said master strap and each having a ring at each end thereof, and detachable fastening means for fastening one end ring of each auxiliary strap means to the adjacent one of said depending intermediate rings and for fastening the opposite end rings of said auxiliary strap means to certain of said anchoring devices adjacent the other two diagonally opposite corners of said cargo unit, whereby tightening adjustment of said auxiliary strap means is effective to tighten said master strap means angularly across the ends and longitudinally over the top of said cargo unit.

JOSEPH S. MARTIN.